US006576925B2

United States Patent
Tsujimura et al.

(10) Patent No.: US 6,576,925 B2
(45) Date of Patent: Jun. 10, 2003

(54) THIN FILM TRANSISTOR, LIQUID CRYSTAL DISPLAY PANEL, AND MANUFACTURING METHOD OF THIN FILM TRANSISTOR

(75) Inventors: Takatoshi Tsujimura, Fujisawa (JP); Kohichi Miwa, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/775,974

(22) Filed: Feb. 2, 2001

(65) Prior Publication Data

US 2001/0043292 A1 Nov. 22, 2001

(30) Foreign Application Priority Data

Feb. 4, 2000 (JP) ........................................ 2000-028357

(51) Int. Cl.[7] ................................................ H01L 29/04
(52) U.S. Cl. ............................ 257/59; 257/52; 257/57; 257/58; 257/62; 257/72; 257/130; 257/347
(58) Field of Search ........................... 257/59, 57–58, 257/72, 52, 62, 130, 347, 349, 354

(56) References Cited

U.S. PATENT DOCUMENTS

| | | | | |
|---|---|---|---|---|
| 4,869,576 A | * | 9/1989 | Aoki et al. ................. | 350/336 |
| 4,948,231 A | * | 8/1990 | Aoki et al. ................. | 350/334 |
| 5,473,168 A | * | 12/1995 | Kawai et al. ................. | 257/61 |
| 5,606,179 A | * | 2/1997 | Yamazaki et al. ............. | 257/59 |
| 5,656,824 A | * | 8/1997 | den Boer et al. ............. | 257/59 |
| 5,796,116 A | * | 8/1998 | Nakata et al. ................ | 257/66 |
| 5,828,430 A | * | 10/1998 | Nishida ....................... | 349/44 |
| 6,174,745 B1 | * | 1/2001 | Szydlo et al. ................ | 438/30 |

FOREIGN PATENT DOCUMENTS

| | | | |
|---|---|---|---|
| EP | 2 291 268 | * | 1/1996 |
| JP | 02-010331 | | 1/1990 |
| JP | 3-155676 | * | 7/1991 |
| JP | 04-242726 | | 8/1992 |
| JP | 06-059277 | | 3/1994 |
| JP | 07-030117 | | 1/1995 |
| JP | 9-281522 | * | 10/1997 |
| JP | 10-070276 | | 3/1998 |
| JP | 10-189977 | * | 7/1998 |
| JP | 11214603 | | 8/1999 |

* cited by examiner

Primary Examiner—Nathan J. Flynn
Assistant Examiner—Ahmed N. Sefer
(74) Attorney, Agent, or Firm—Scully, Scott, Murphy, Presser; Derek S. Jennings, Esq.

(57) ABSTRACT

The present invention relates to minimizing a leakage current in a floating island region formed in a thin film transistor, and to maintaining a large ON-current required for an operation of the TFT. More specifically, the present invention is directed to a thin film transistor includes: a gate electrode 18 disposed above an insulating substrate and formed in a predetermined pattern; an a-Si film 16 formed in accordance with the pattern of the gate electrode 18; a source electrode 14 formed via the a-Si film 16; and a drain electrode 15 disposed at a predetermined interval from the source electrode 14. The a-Si film 16 includes a floating island region 22 above which or beneath which the gate electrode 18 is not disposed; and the source electrode 14 and the drain electrode 15 are configured in a manner that a channel length of an OFF-current in the floating island region 22, $L_{OFF}$, is longer than the channel length of an ON-current formed by the source electrode 14 and the drain electrode 15 located above or beneath the gate electrode 18, $L_{ON}$.

11 Claims, 9 Drawing Sheets

THIN FILM TRANSISTOR, LIQUID CRYSTAL DISPLAY PANEL, AND MANUFACTURING METHOD OF THIN FILM TRANSISTOR

BACKGROUND OF THE INVENTION

1. Technical Field

The present invention relates to a thin film transistor that is used in liquid crystal displays of the active matrix system, and a method for manufacturing such a thin film transistor.

2. Prior Art

In a liquid crystal display of the active matrix system that uses thin film transistors, liquid crystals are sealed between a TFT array substrate and a counter substrate overlapping the TFT array substrate with a certain distance. On the TFT array substrate, gate electrodes (Y electrodes) and signal line (X electrodes) are arranged as a matrix, and thin film transistors (TFTs) are disposed on the intersections of the gate electrodes and the data electrodes. The thin film transistors control the voltage impressed to the liquid crystals, and the electrooptic effect of the liquid crystals is utilized to enable displaying.

FIGS. 7A and 7B are diagrams illustrating the structure of a top-gate type thin film transistor. Conventionally known structures of thin film transistors are a top-gate (positive-stagger) type structure and a bottom-gate (inverse-stagger) type structure. The structure of a top-gate type thin film transistor will be described referring to FIG. 7A. The top-gate type thin film transistor comprises a light-shield film 102 provided on an insulating substrate 101 such as a glass substrate, on which an insulating film 103 comprising silicon oxide, $SiO_x$, or silicon nitride, $SiN_x$, is formed. Above the insulating film 103, a drain electrode 104 and a source electrode 105 composed of ITO (indium tin oxide) films are disposed at a predetermined channel distance. An amorphous silicon film (a-Si film) 106, as a semiconductor film, that covers both electrodes is provided; a gate insulating film 107 comprising $SiO_x$ or $SiN_x$, is provided above the a-Si film 106; and a gate electrode 108 is provided above the gate insulator film 107, to form an island-shaped region called an a-Si island.

As a process for the manufacture of such a thin film transistor, a process known as 7-PEP (PEP: photo engraving process) structure is generally present. In this 7-PEP structure, after a drain electrode 104 and a source electrode 105 composed of ITO film have been patterned, an a-Si film 106 is formed by CVD (chemical vapor deposition), and is patterned in an island shape. A gate insulating film 107 is then formed by CVD, and is patterned to a desired shape. After that, a gate electrode 108, for example of aluminum (Al), is formed by sputtering, and is patterned to complete a TFT.

However, since such a 7-PEP structure required a large number of process steps, a next-generation 4-PEP structure that requires less process steps has been proposed. In the 4-PEP structure, the gate insulating film 107 and the a-Si film 106 underlying the gate electrode 108 are simultaneously etched. That is, the gate electrode 108, the gate insulating film 107, and the a-Si film 106 are sequentially etched in one patterning step using the plated pattern of the gate electrode 108 as a mask. The 4-PEP structure excels in that the manufacturing process is shortened. FIG. 7A shows the top-gate type thin film transistor produced by the shortened manufacturing process.

Here, if the gate electrode 108, the gate insulating film 107, and the a-Si film 106 are sequentially etched, the distance between the end of the gate electrode 108 and the source and drain electrodes 105 and 104 is much shortened as shown in FIG. 7A. That is, this distance is at largest 0.4 μm, easily causing short-circuiting between the end surface of the gate electrode 108 and the source and drain electrodes 105 and 104 due to surface leakage.

To cope with this problem, the gate electrode 108 is over-etched as shown in FIG. 7B. That is, by over-etching the gate electrode 108 during patterning, a length of about 1.5 μm is secured as shown in FIG. 7B, and by clearing a distance of 1.9 μm (about 2 μm) between the source electrode 105 and the drain electrode 104, short-circuiting due to surface leakage is prevented.

The present applicant has presented Japanese Patent Application No. 11-214603 as a technique related to this shortened manufacturing process. In the present application, techniques for decreasing the number of process steps required in the manufacturing process of thin film transistors, as well as for preventing the generation of an abnormal potential due to leakage current from other data lines.

As described above, the over-etching of the gate line at the time of forming the gate electrode 108 of a top-gate type TFT, and the island cutting using a resist mask (not shown) for forming the gate electrode 108 (etching of the gate insulating film 107 and the a-Si film 106) enable the simplification of the process and the prevention of short-circuiting due to surface leakage.

However, the inventors of the present invention found that the a-Si film 106 and the gate insulator film 107 were exposed in the above-described method might resulting in the occurrence of leakage in the island portion not covered with the gate electrode 108 (floating island region).

FIG. 8 is a diagram that illustrates the states where the floating island portion has been formed. In FIG. 8, a source electrode 111 and a drain electrode 112 are disposed at a predetermined interval, and substantially parallel to each other, and are orthogonal to the gate electrode 110 to form a TFT of a +-shaped structure. This TFT of a +-shaped structure is described in detail in the above-described Japanese Patent Application No. 11-214603, as a TFT that can prevent undesired current (cross talk) from the adjacent data lines (not shown) with the drain electrode 112 across the gate electrode 110, and can minimize the effect of misalignment.

Here, the circumference region of the gate electrode 110 where the a-Si film 106 and the gate insulator film 107 are exposed is the floating island region 109. Although electrodes are normally disposed above and beneath an a-Si film, the gate electrode 110 is not formed above or beneath the a-Si film 106 as a semiconductor layer that constitutes this floating island portion 109, which is unique as the usage of a-Si. Therefore, voltage is not controlled in this floating island portion 109. That is, the floating island portion 109 is not covered with the gate electrode 110, and is in the state where portions nearer the end are more difficult to be controlled by the gate voltage of the gate electrode 110. The detection of leakage paths using OBIC (optically beam induced current) analysis revealed that leakage occurred due to the voltage between the source electrode 111 and the drain electrode 112 at the portion in the floating island 109 between the source electrode 111 and the drain electrode 112, above which or beneath which the gate electrode 110 is not formed, that is, the hatched area shown in FIG. 8. When leakage occurs at the leakage portion, i.e. the hatched area, voltage cannot be controlled between the source electrode 111 and the drain electrode 112, and the problem such as the discoloration of pixels due to an abnormal voltage has arisen.

FIG. 9 is a graph that shows the volt-ampere characteristic of the TFT of the type shown in FIG. 8 (+-shaped TFT). The abscissa indicates gate voltage (Vg), and shows the state where the gate electrode 110 is OFF in a range of, for example, −5V to −7V. The ordinate indicates source-drain current (Ids). Reference character L indicates the distance between the source electrode 111 and the drain electrode 112. As is obvious from FIG. 9, the OFF-current (current when the gate electrode 110 is OFF) rapidly decreases with increase in L. This is because the voltage impressed to the floating island region 109 is switched from source-drain voltage controlled to gate voltage controlled with increase in $L_{OFF}/\Delta W$ from the relationship of the source-drain distance L in the hatched area shown in FIG. 8, $L_{OFF}$, and the width, $\Delta W$. For this reason, by increasing L ($L_{OFF}$), the voltage between the source electrode 111 and the drain electrode 112 does not affect a-Si present in the floating island region 109, but the voltage of the gate electrode 110 affects the a-Si significantly, and leakage voltage can be decreased.

On the other hand, however, when the distance between the source electrode 111 and the drain electrode 112 in the area in which the TFT actually operates, $L_{ON}$, increases, the ON-current required for the TFT to operate actually, $I_{ON}$, decreases in inverse proportion to $L_{ON}$. Since larger value of the ON-current ($I_{ON}$) (for example, the current value when the gate voltage (Vg) shown in FIG. 9 is within a range of 20 to 25V) is preferable, a shorter L ($L_{ON}$) is preferable from the point of view of the ON-current ($I_{ON}$).

Therefore, the present invention is achieved to solve the above technical problems and the object of the present invention is to reduce leakage current in a floating island region formed in a thin film transistor, as well as to maintain the ON-current required for the TFT to operate high.

SUMMARY OF THE INVENTION

A thin film transistor to which the present invention is applied comprises a gate electrode disposed above an insulating substrate and formed in a predetermined pattern; a semiconductor layer formed in relation to the pattern of the gate electrode; a pixel electrode formed via the semiconductor layer; and a signal electrode formed via the semiconductor layer and disposed at a predetermined interval from the pixel electrode. The semiconductor layer has a floating island region above which or beneath which the gate electrode is not formed. The pixel and signal electrodes are configured in a manner that the OFF-current channel length formed by the pixel and signal electrodes in the floating island region is longer than the ON-current channel length formed by the pixel and signal electrodes disposed above or beneath the gate electrode.

Here, the signal electrode may be characterized in being disposed at the location for impeding cross talk that flows from adjacent signal lined to the pixel electrode via the semiconductor layer.

Also, a thin film transistor to which the present invention is applied comprises a source electrode and a drain electrode disposed above an insulating substrate at a predetermined interval; a semiconductor layer disposed in relation to the source and drain electrodes; a gate insulator film overlapping the semiconductor layer; and a gate electrode overlapping the gate insulator film. The semiconductor layer has a floating island region above which or beneath which the gate electrode is not formed. The source and drain electrodes are configured in a manner that the channel length formed by the source and drain electrodes in the floating island region is 18 $\mu$m or more.

Furthermore, the source and drain electrodes may be characterized in being configured in a manner that the channel length above or beneath the gate electrode is 4 $\mu$m or less.

According to the above configuration, the leakage current caused by the floating island region can be restrained, and the required ON-current can be secured sufficiently.

Also, a thin film transistor to which the present invention is applied comprises a gate electrode disposed above an insulating substrate and formed in a predetermined pattern; a semiconductor layer formed in a pattern substantially identical to the pattern of the gate electrode; a source electrode formed via the semiconductor layer; and a drain electrode formed via the semiconductor layer and disposed at a predetermined interval from the source electrode. The source and drain electrodes are configured in a manner that the OFF-current that flows between the source electrode and the drain electrode when the voltage by the gate electrode is OFF is less than $1 \times 10^{-12}$ A, and the ON-current that flows between the source electrode and the drain electrode when the voltage by the gate electrode is 20V or more is $1 \times 10^{-6}$ A or more.

Furthermore, the semiconductor layer is characterized in comprising a floating island region above which or beneath which the gate electrode is not formed, and in that the source and drain electrodes are configured in a manner that the OFF-current that flows in the floating island region is less than $1 \times 10^{-12}$ A.

Furthermore, if the source and drain electrodes are characterized in being configured in a manner that the OFF current is less than $1 \times 10^{-12}$ A and the ON-current is $1 \times 10^{-6}$ A or more, based on the location of the source and drain electrodes in the floating island region, and the source and drain electrodes disposed above or beneath the gate electrode, the leakage current caused by the floating island region can be impeded, and high TFT characteristics can be secured by the planar shapes of the source and drain electrodes.

In these inventions, it is sufficient if the pixel electrode (source electrode) and the signal electrode (drain electrode) are formed "above" the insulating substrate, and these inventions can be applied to either a top-gate type TFT provided with these electrodes on the insulating substrate side, above which a gate electrode is provided; or a bottom-gate type TFT provided with a gate electrode on the insulating substrate side, above which source and drain electrodes are formed. The expression of "overlapping" contains not only overlying, but also underlying, and it is not necessary to contact with each other, but the laminated construction with other materials intervening inbetween may be used.

On the other hand, a liquid crystal display panel to which the present invention is applied comprises gate lines and signal lines arranged in a matrix shape, and thin film transistors arranged on the intersections of said gate lines and signal lines, and operating liquid crystals by applying a voltage to the display electrode. The thin film transistor comprises a gate electrode connected to the gate lines and formed integrally with the gate lines, a drain electrode connected to the signal lines, a source electrode connected to the display electrode disposed at a predetermined interval in relation to the drain electrode, and a semiconductor layer formed between the source and drain electrodes and the gate electrode. The semiconductor layer has a region around the gate electrode and not located above or beneath the gate electrode, and patterned across the region of the thin film transistor and along the gate lines. The drain electrode is configured in a manner to impede the current flowing from adjacent signal lines into the source electrode via the semiconductor layer, and configured in a manner that the length of the channel formed between the drain electrode and the source electrode is long in the region not above or beneath the gate electrode, and is short in the region above or beneath the gate electrode.

If the drain electrode is characterized in being configured in a manner that the channel length in the region not located above or beneath the gate electrode is 18 μm or more, the control by the gate electrode is enhanced even when the gate voltage is OFF, and leakage current caused by the region not located above or beneath the gate electrode can be minimized.

Furthermore, if the drain electrode is characterized in being configured in a manner that the channel length in the region located above or beneath the gate electrode is 4 μm or less, required TFT characteristics can be maintained even when the leakage current is to be minimized.

Furthermore, if the drain electrode is characterized in being configured in a manner to separate the thin film transistor region from the gate line, the generation of an abnormal potential due to cross talk from adjacent signal lines can be prevented.

Furthermore, a method for manufacturing a thin film transistor to which the present invention is applied comprises a light-shield film deposition step of depositing a light-shield film on a substrate; an insulating film formation step of forming an insulating film that covers the light-shield film on the insulating substrate; a pixel and signal electrodes formation step of forming a pixel electrode and a signal electrode on the insulating film; a semiconductor layer and insulating films formation step of for sequentially forming a semiconductor layer and a gate insulator film above the pixel electrode and the signal electrode; a gate electrode deposition step of depositing a metal film for the gate lines and the gate electrode above the gate insulator film; a gate electrode patterning step of providing a resist mask above the metal film for the gate lines and the gate electrode, and for patterning the gate lines and the gate electrode using the resist mask; a semiconductor layer patterning step of patterning the semiconductor layer and the gate insulator film using the resist mask, forming a floating island region around the gate electrode, above which the gate electrode is not disposed; and a step of peeling off the resist mask. This pixel and signal electrodes forming step is characterized in that the signal electrode is formed in the location that separates the regions of the gate lines and the gate electrode patterned in the gate electrode patterning step, and the pixel electrode and the signal electrode are formed in a manner that the distance between the pixel electrode and the signal electrode is long in the floating island region, and is short in the region above which the gate electrode is disposed.

Also, this gate electrode patterning step is characterized in that the metal film for the gate electrode is over-etched in relation to the resist mask to pattern the gate electrode.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

The present invention will be described in detail below referring to the embodiments of the present invention shown in attached drawings.

Figure 1:
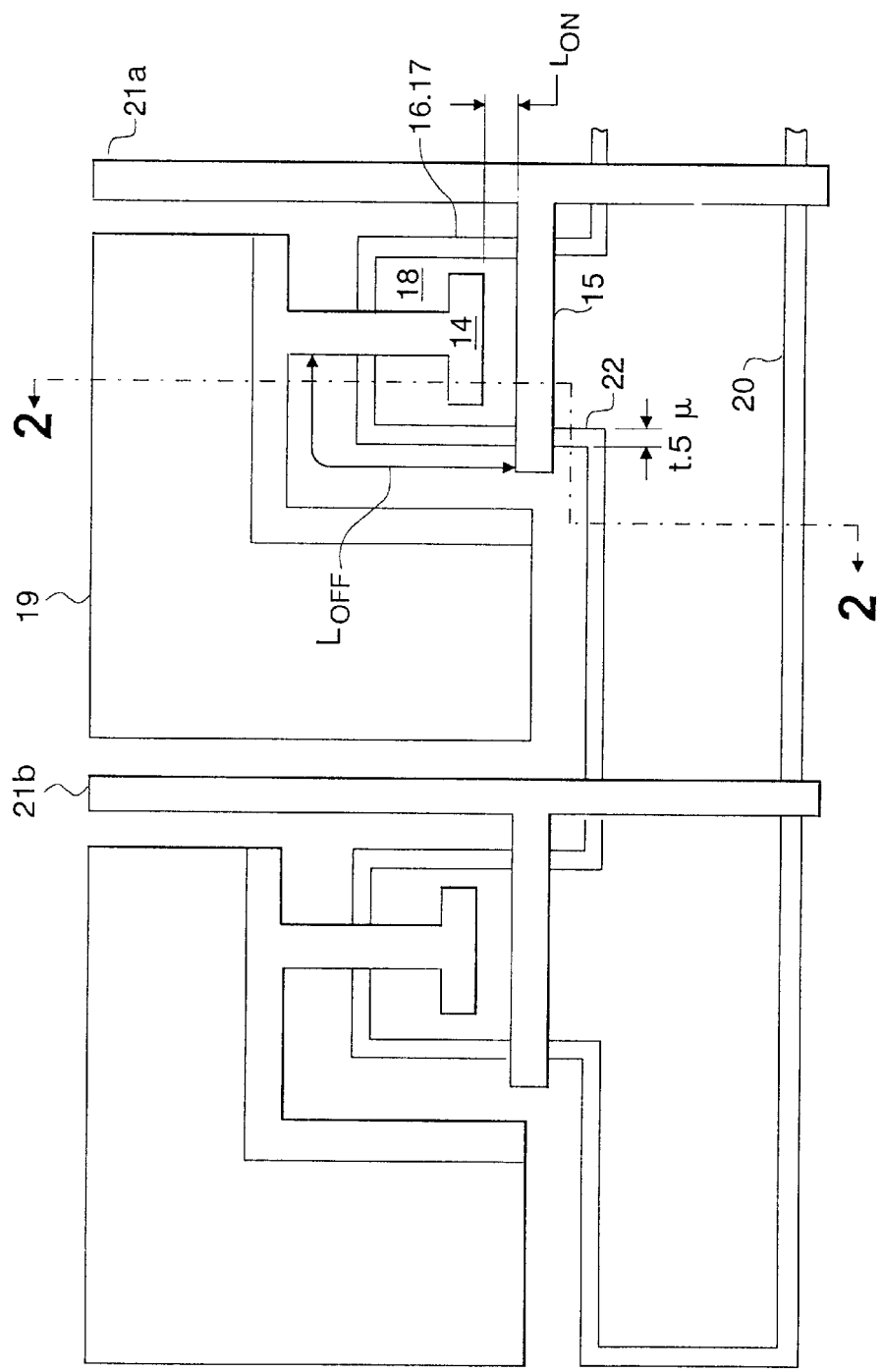
FIG. 1 is a plan view showing the structure of a thin film transistor (TFT) according to an embodiment of the present invention.
Figure 2:
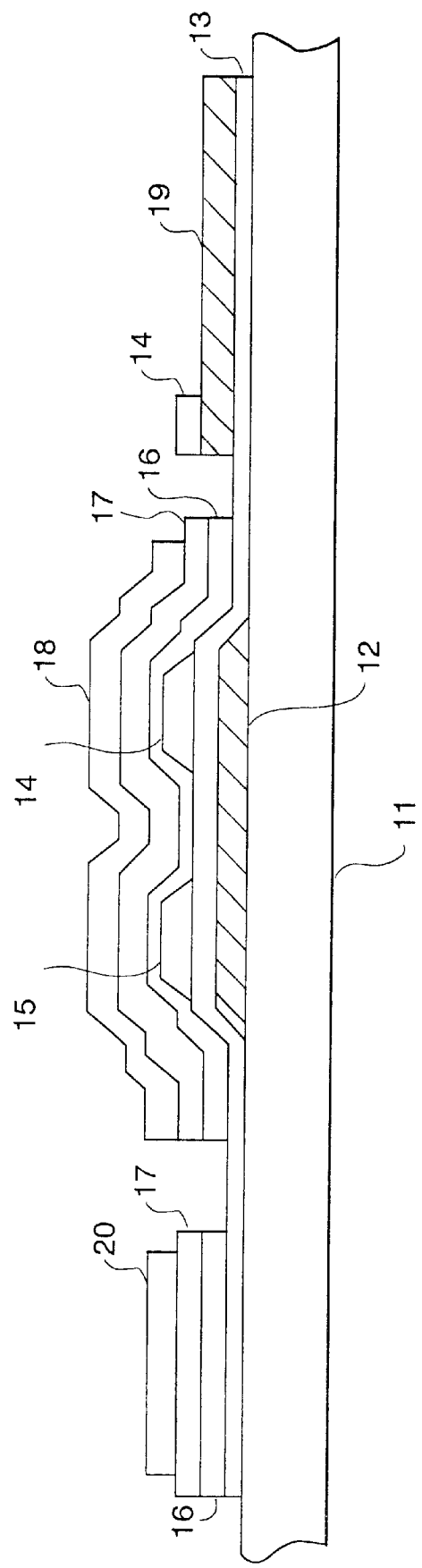
FIG. 2 is a sectional view of FIG. 1 taken along line A–A'.

FIG. 1 is a plan view showing the structure of a thin film transistor (TFT) of this embodiment. FIG. 2 is a sectional view of FIG. 1 taken along line A–A'. For the ease of technical understanding, the structure indicated by symbols 14, 15, 21a, and 21b in FIG. 1 is shown by bold lines at the topmost portion; therefore, the relative locations of the elements shown in FIG. 1 differ from the actual product.

As FIG. 2 shows, the TFT of this embodiment comprises a light-shield film 12 comprising Mo and an Mo alloy such as Mo—Cr disposed on an insulating substrate 11 made of alkali-free glass or quartz, and an insulating film 13 as an undercoat film comprising silicon oxide $SiO_x$ or silicon nitride $SiN_x$ that covers the light-shield film 12. A display electrode 19 comprising indium tin oxide (ITO) as a transparent conductive film is formed above the insulating film 13, and patterned are a source electrode (pixel electrode) 14 and a drain electrode (signal electrode) 15 formed integrally with this display electrode by laminating a metal film of Mo or an Mo alloy with Ti, Ta, Cr, Nb, W, or Ag, e.g. a molybdenum-tungsten alloy (Mo—W) on the upper layer of the ITO film.

Above the patterned source electrode 14 and drain electrode 15 is deposited an a-Si film 16 that forms the semiconductor film, above which a gate insulating film 17 composed of a first silicon nitride film (first $SiN_x$ film) and a second silicon nitride film (second $SiN_x$ film) as the passivation film of the TFT channel is deposited. Furthermore, a gate electrode 18 composed of a metal such as Cr and Al is formed above the gate insulating film 17.

As FIG. 1 shows, the source electrode 14 and the drain electrode 15 are disposed at a predetermined line width and a predetermined interval. The drain electrode 15 is integrally patterned with signal lines (data lines) 21a, 21b, and the source electrode 14 is formed so as to contact the display electrode 19. On the other hand, the gate electrode 18 is configured by the portion protruded from the gate line 20, and the gate electrode 18 is used as the gate line 20 as it is.

In the TFT of this embodiment, the gate insulator film 17 consisting of the a-Si film 16, the first $SiN_x$ film, and the second $SiN_x$ film is simultaneously etched using the patterns of the gate line 20 and the gate electrode 18 as a mask for reducing the time for the process as described later. As a result, as FIG. 2 shows, the a-Si film 16 and the gate insulator film 17 remain in all the portions beneath the gate line 20 and unnecessary semiconductor layer remains beneath the gate line 20 other than the a-SI island.

Furthermore, in the TFT according to this embodiment, a drain electrode 15 substantially orthogonal to the gate electrode 18, which is the portion protruded from the gate line 20, is disposed to form a so-called a-Si island of the thin film transistor (TFT). That is, the drain electrode 15 is orthogonal to the gate electrode 18 at the location closer to the gate line 20 than the source electrode 14 as FIG. 1 shows, and is configured so as to be able to separate the gate electrode 18 forming the a-Si island from the gate line 20. Thereby, for example, the drain electrode 15 integrally formed with the signal line 21a can interrupt cross talk from the adjacent signal line 21b or the like, and can prevent leakage current to the display electrode 19.

Also, in the TFT according to this embodiment, the circumference of the gate electrode 18 is over-etched in a width of about 1.5 $\mu$m to prevent short-circuiting due to surface leakage, resulting in the formation of a floating island region 22 in which the a-Si film 16 and the gate insulator film 17 are exposed without being covered with the gate electrode 18 around the gate electrode 18. If the voltage of the gate electrode 18 cannot control the floating island region 22, an OFF-current may be generated by the leakage due to voltage between the drain electrode 15 and the source electrode 14.

Figure 9:
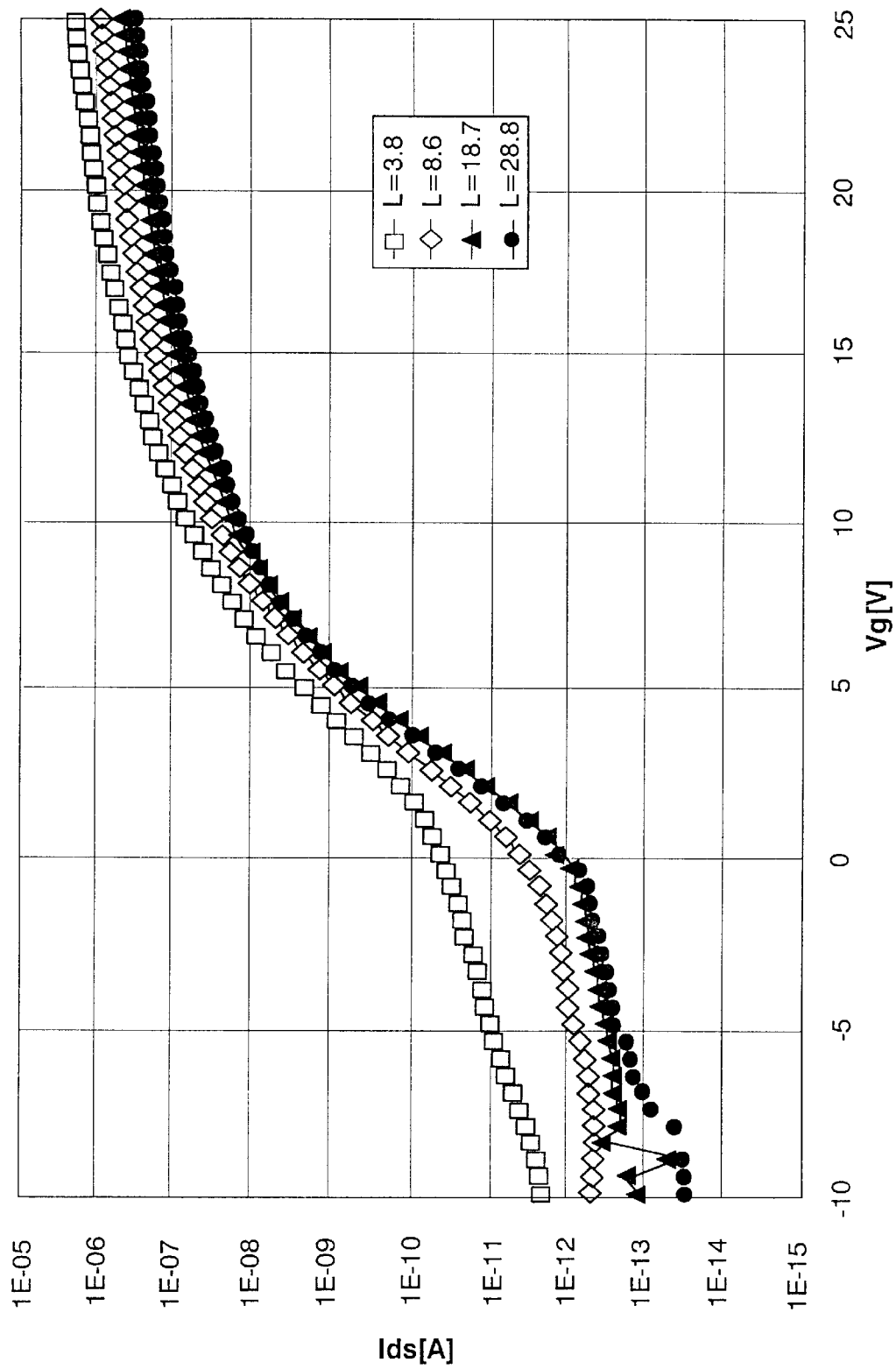
FIG. 9 is a graph showing the volt-ampere characteristic of the TFT of the type shown in FIG. 8 (+-shaped TFT).

The above-described graph of FIG. 9 showing the results of an experiment shows that the OFF-current is sufficiently small when the source-drain distance (channel length) in the floating island region 22, $L_{OFF}$, is 18.7 $\mu$m. That is, if $L_{OFF}$ is 18 $\mu$m or more, control by the gate electrode 18 can be increased, reducing the OFF-current, or leakage. The ON-current required to make the TFT operate actually, $I_{ON}$, can be increased by shortening the distance between the source and drain electrodes (channel length), $L_{ON}$, above and beneath the gate electrode 18. From the graph of FIG. 9 showing the results of an experiment, it is known that the channel length of as short as 8.6 $\mu$m is not enough, but a sufficiently large ON-current can be obtained when the channel length is 3.8 $\mu$m. Namely, it is preferable to shorten the $L_{ON}$ to 4 to 5 $\mu$m.

Figure 8:
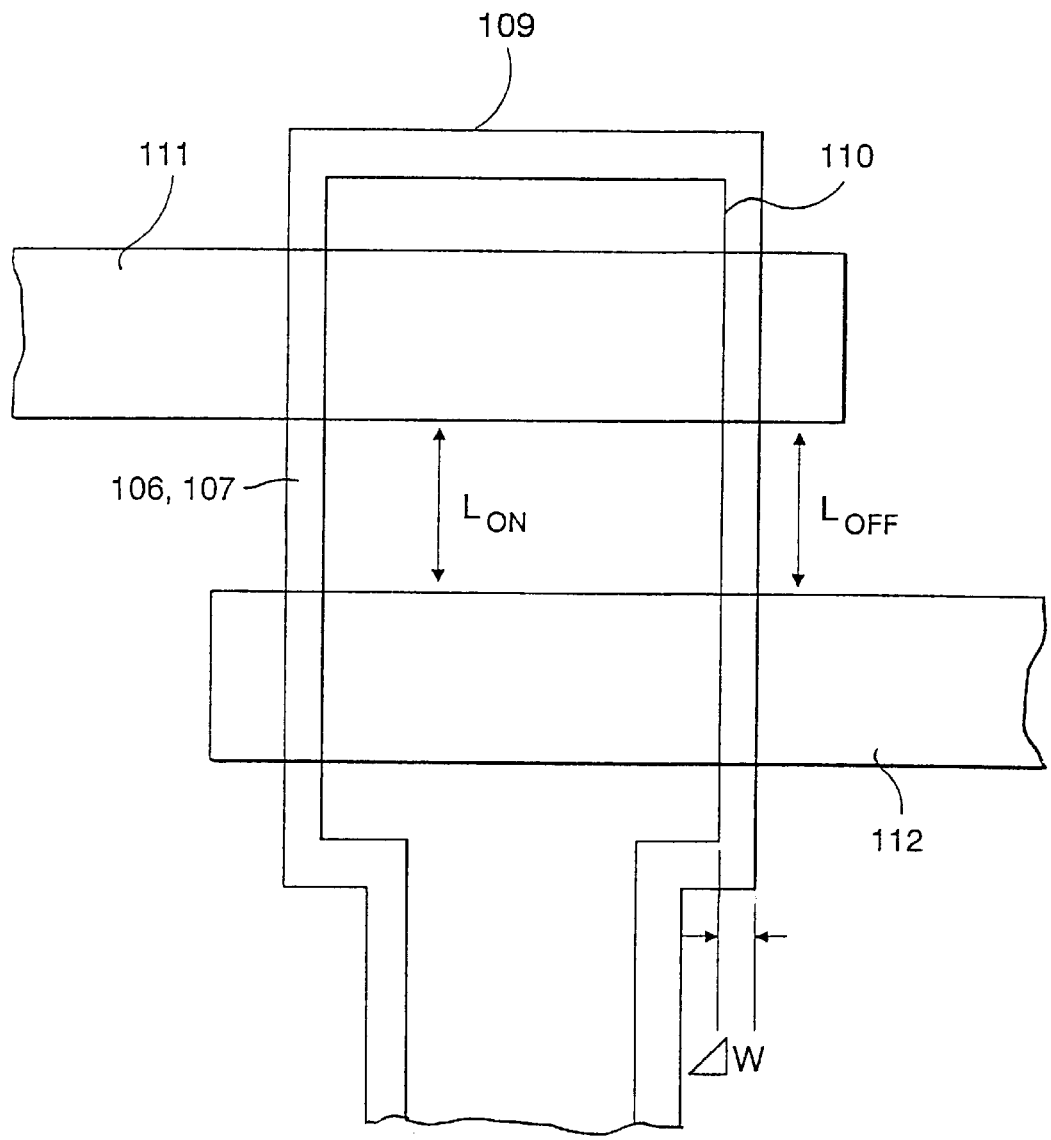
FIG. 8 is a diagram illustrating the state after a floating island portion has been formed.

Responding to results of the experiment shown in FIG. 9, in the TFT shown in FIG. 1, the portion of the source electrode 14 extending to the display electrode 19 was configured so as to extend to the upward direction orthogonal to the drain electrode 15 (direction opposite to the drain electrode 15). As a result, as FIG. 1 shows, the channel length (distance between the drain electrode 15 and the source electrode 14), $L_{ON}$, in the region where the TFT actually operates (the range covered by the gate electrode 18) can be made very short, while the channel length in the floating island region 22 related to the generation of OFF-current, $L_{OFF}$, can be made very long. By the structure of the TFT of FIG. 1, the ON channel length, $L_{ON}$, can be shortened to 4 $\mu$m or less, while the OFF channel length, $L_{OFF}$, can be made 18 $\mu$m or more. That is, the ON channel length, $L_{ON}$, and the OFF channel length, $L_{OFF}$, can be determined independently, and $L_{OFF}/\Delta W$ described using FIG. 8 can be increased. As a result, advantages of each of the experimental results shown in FIG. 9 can be utilized, resulting in the sufficient security of required ON-current, as well as the restraint of leakage current caused by the floating island region 22.

The preferable level of the OFF-current flowing between the source and the drain in the floating island region 22 is less than the current value shown in FIG. 9 of IE-12 ($1\times10^{-12}$) A, more preferably approximately IE-13 ($1\times10^{-13}$) A. Also, the preferable level of the ON-current flowing beneath the actual TFT structure above which and beneath which the gate electrode 18 is disposed is the current value of IE-06 ($1\times10^{-6}$) A or more when the voltage by the gate electrode 18 is 20V or more. In other words, the structure of the TFT shown in FIG. 1 should be configured in a manner that the plane structure of the source electrode 14 and the drain electrode 15 is made to generate such ON-current and OFF-current.

Figure 3:
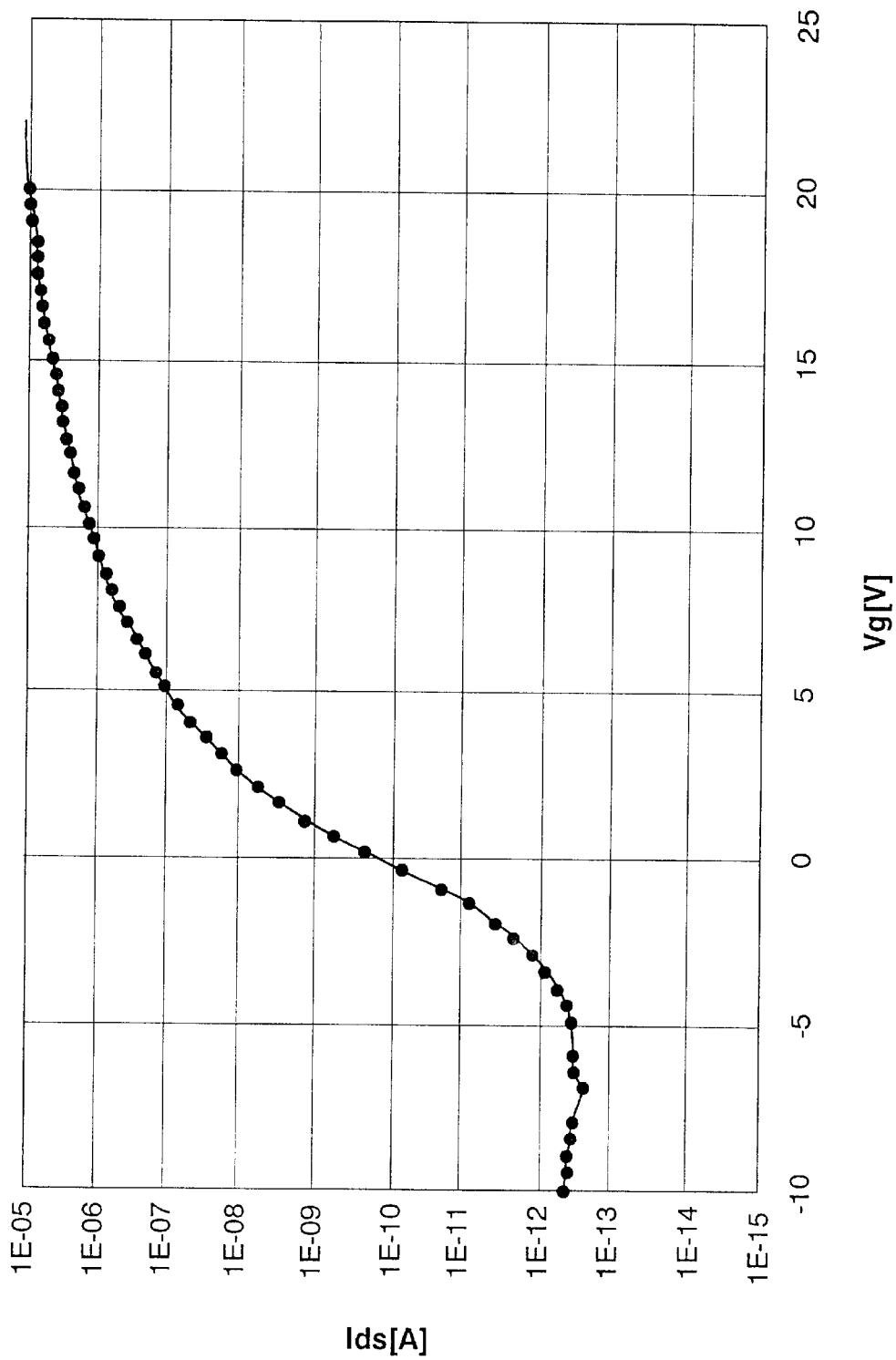
FIG. 3 is a graph showing voltage-current characteristic of a TFT structure shown in FIG. 1.

FIG. 3 is a graph showing the volt-ampere characteristic of the TFT structure shown in FIG. 1. The abscissa indicates the gate voltage (Vg), and the ordinate indicates the source-drain current (Isd). As is obviously shown in FIG. 3, when the gate electrode 18 is OFF, for example, when Vg is −5V to −7V, Ids is smaller than IE-12 ($1\times10^{-12}$) A, and is sufficiently small OFF-current. When the gate electrode 18 is ON, for example, when Vg is 15V to 20V, Ids is larger than IE-06 ($1\times10^{-6}$) A, and a large current value can be obtained. Thus, when the TFT of this embodiment is used, the TFT that excels in the holding characteristics can be formed without increasing auxiliary capacity, and the sufficient open area ratio can be maintained even when the TFT is highly miniaturized.

Figure 4:
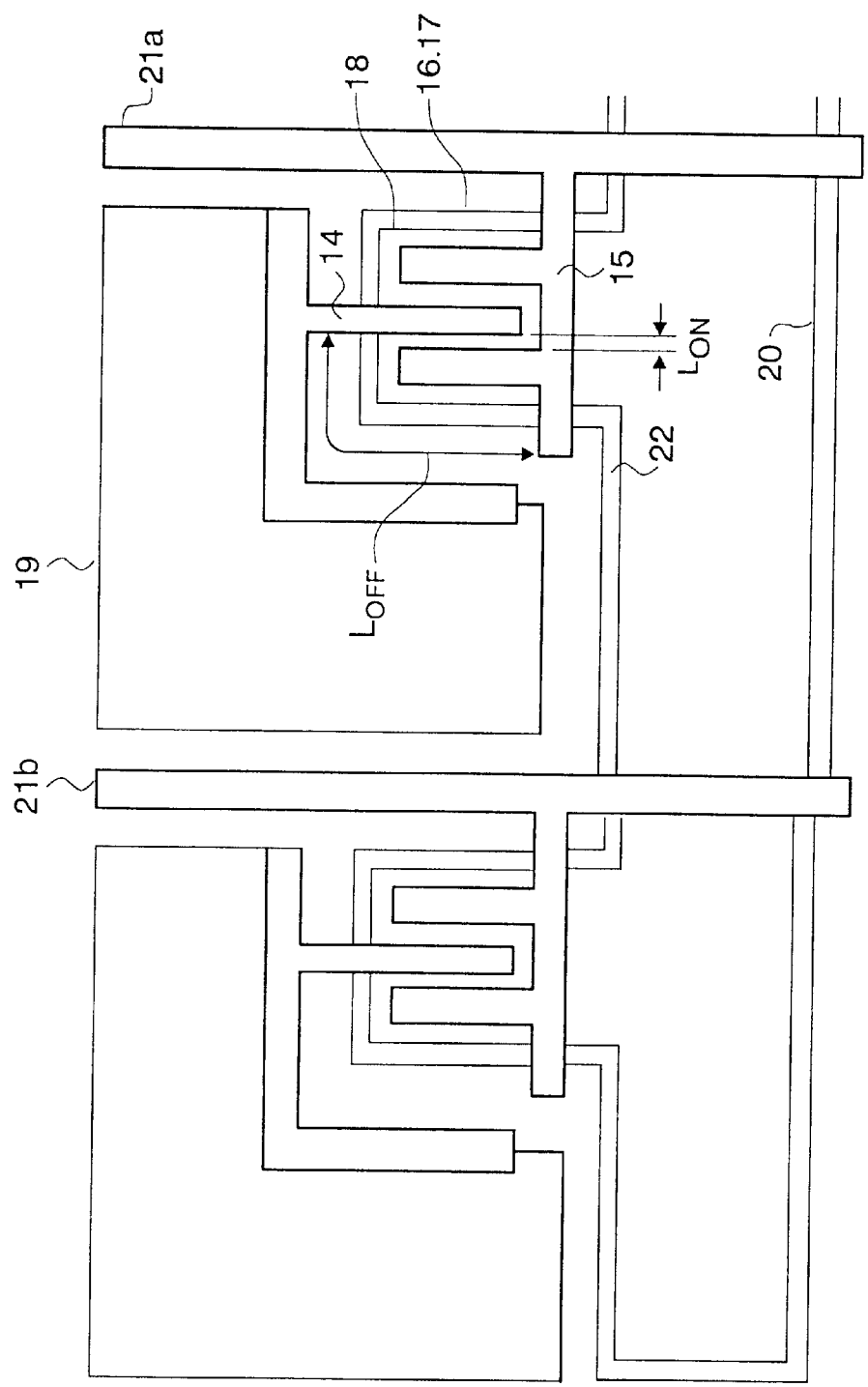
FIG. 4 is a diagram showing a modified example of the TFT structure shown in FIG. 1.
Figure 5:
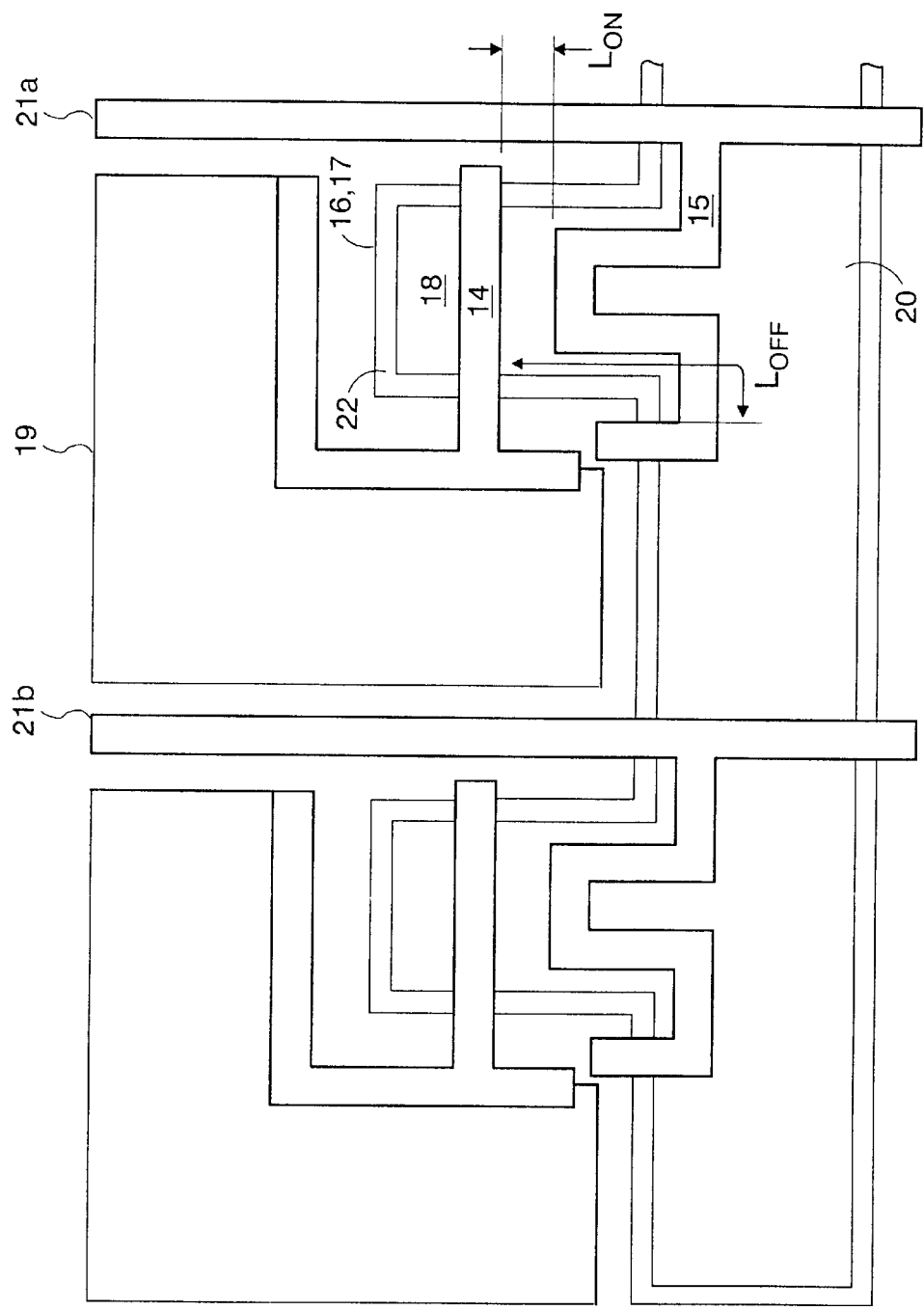
FIG. 5 is a diagram showing another modified example of the TFT structure shown in FIG. 1.

FIGS. 4 and 5 show the modifications of the TFT structure shown in FIG. 1. In FIG. 4, the TFT is configured in a manner that the drain electrode 15 is comb-shaped, and the source electrode 14 is linear in the upward direction of the drawing to make the channel length of the floating island region 22, $L_{OFF}$, long, and to make the ON channel length in the area covered by the gate electrode 18, $L_{ON}$, short. In FIG. 5, the TFT is configured in a manner that the source electrode 14 is orthogonal to the protruded portion of the gate electrode 18, and the drain electrode 15 is bent at several locations, to make the channel length of the floating island region 22, $L_{OFF}$, long, and to make the ON channel length in the area covered by the gate electrode 18, $L_{ON}$, short. According to these TFT structures shown in FIGS. 4 and 5, the ON channel length, $L_{ON}$, can be shortened to 4 $\mu$m or less, while the OFF channel length, $L_{OFF}$, can be easily made 18 $\mu$m or more like the TFT structure shown in FIG. 1. As a result, the required ON-current can be secured sufficiently, and the leakage current caused by the floating island region 22 can be restrained.

The TFT structures shown in FIGS. 4 and 5 are also configured in a manner that the drain electrode 15 can separate the gate electrode 18 forming the a-Si island at the location closer to the gate line 20 than the source electrode 14 like the TFT structure shown in FIG. 1. As a result, the drain electrode 15 integrally formed with the signal line 21a can interrupt cross talk from the adjacent signal line 21b or the like, and can prevent leakage current to the display electrode 19 as in FIG. 1. Although the structure of a top-gate type thin film transistor was described above, the present invention can be similarly applied to the structure of a bottom-gate type thin film transistor. That is, even in a bottom-gate type thin film transistor, the similar problems arise in a TFT that has the structure in which an a-Si film serving as a semiconductor layer is present in the region between the source electrode and the drain electrode, not above the gate electrode (floating island region). Therefore, the TFT structure can be configured in a manner that by applying the structure consisting of the source and drain electrodes as described above, the channel length in the floating island region, $L_{OFF}$, is long, and the ON channel length in the area covered by the gate electrode, $L_{ON}$, is short, resulting in the sufficient security of required ON-current, as well as the restraint of leakage current caused by the floating island region.

Next, the process for manufacturing the thin film transistor (TFT) according to this embodiment exemplified by a top-gate type TFT will be described referring to FIGS. 6A to 6D.

Figure 6A:
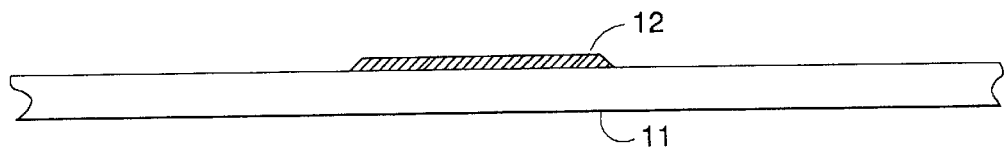
FIGS. 6A to 6D are diagrams illustrating the manufacturing process of a TFT according to an embodiment of the present invention.

As FIG. 6A shows, after cleaning an insulating substrate 11 such as a glass substrate using mechanical cleaning such as brushing (scrubbing) and chemical cleaning with an acid or organic solvent, an Mo alloy for light shielding is deposited to a predetermined film thickness using magnetron sputtering, and a light-shield film 12 is formed using the photolithography technique for photo-etching using a photoresist (not shown) as a mask.

Figure 6B:
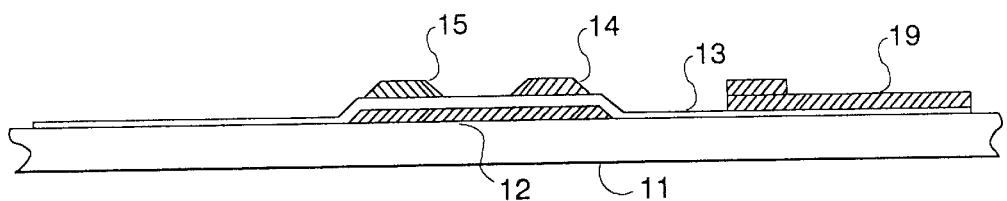

Next, as shown in FIG. 6B an insulating film 13 comprising a silicon oxide ($SiO_x$) film having a strong adhesiveness as an interlayer insulating film by the plasma CVD method. Furthermore, an ITO film for the pixel electrode is deposited, and a display electrode 19 is formed by patterning. Then, ITO films for source and drain electrodes and an Mo-alloy film for the data bus line are sequentially formed by magnetron sputtering, and then the data bus line and drain and source electrodes are patterned using the photolithography technique to form a source electrode 14 and a drain electrode 15.

Figure 6C:
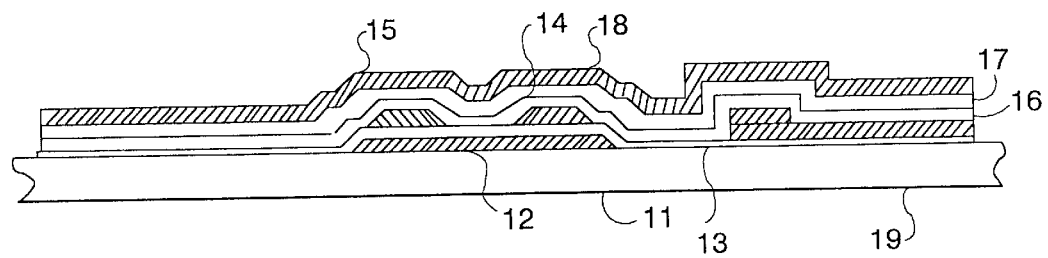

Next, as FIG. 6C shows, an a-Si film 16 as a semiconductor material is deposited using plasma CVD, and then a gate insulating film 17 comprising a first $SiN_x$ film and a second $SiN_x$ film is sequentially deposited by the plasma CVD method. Furthermore, without etching these films, Al for the gate electrode 18 and Al for the gate line (not shown) are deposited by magnetron sputtering. In this embodiment, the etching step after depositing the gate insulating film 17 comprising the a-Si film 16, the first $SiN_x$ film, and the second $SiN_x$ film has been deposited is omitted.

Figure 6D:
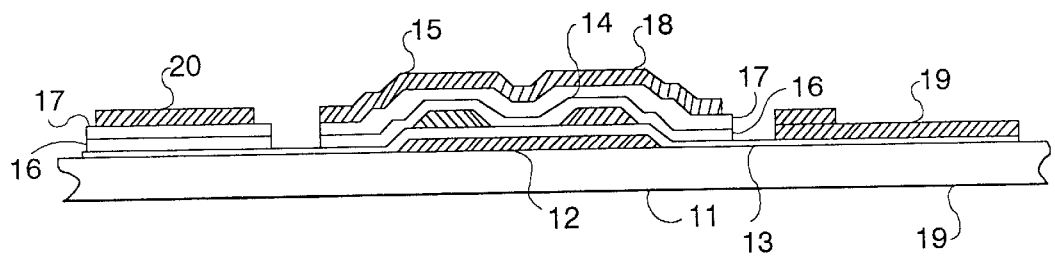
Figure 7A:
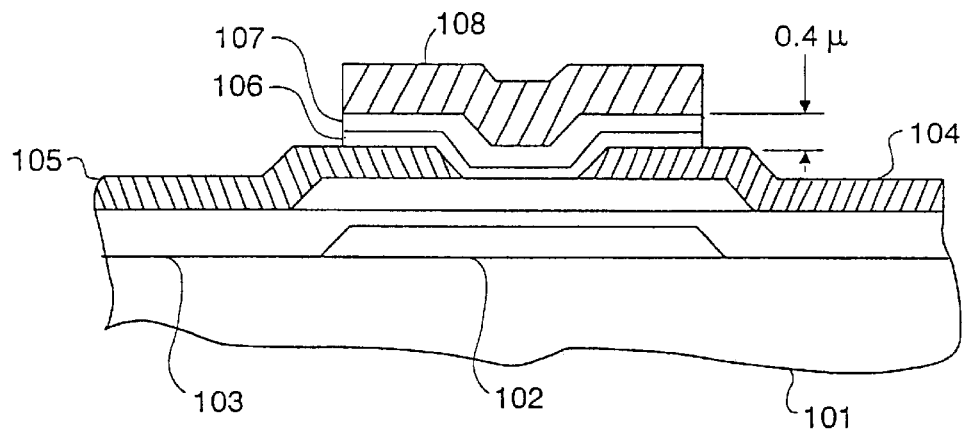
FIGS. 7A and 7B are diagrams illustrating the structure of a top-gate thin film transistor.
Figure 7B:
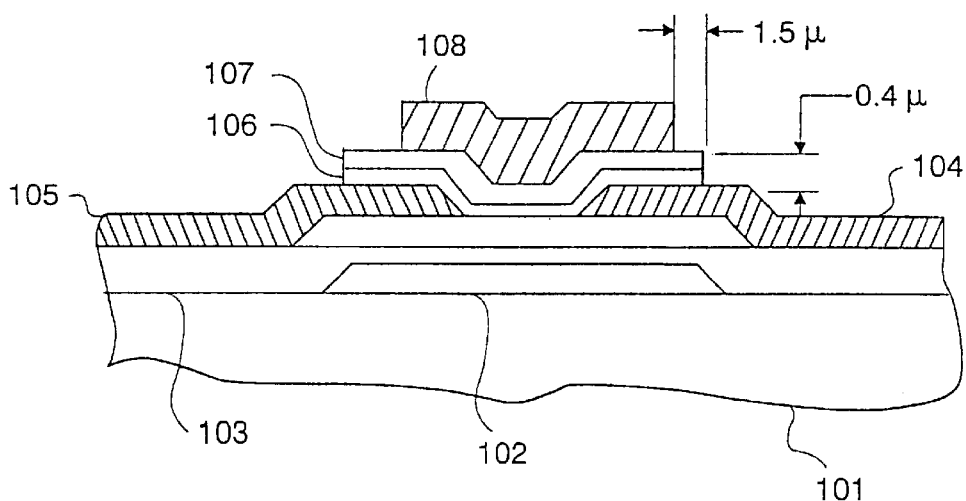

Then, after a resist mask is formed as FIG. 6D shows, a gate electrode 18 and a gate line 20 are formed using the lithography technique. The gate electrode 18 is over-etched to about 1.5 μm inside the resist mask (not shown). Further in this embodiment, the a-Si film 16 and the gate insulating film 17 are simultaneously etched using this resist mask as a mask. As a result, since these films are sequentially etched in a single lithography step, the manufacturing process can be greatly shortened. As a result of shortening the process, the TFT array is formed in a state where the a-Si film 16 and the gate insulator film 17 remaining beneath the gate electrode 18 required for the TFT as well as beneath the gate line 20 cannot be removed. Furthermore, since the gate electrode 18 is over-etched, the a-Si film 16 and the gate insulator film 17 are present in the portion between the source electrode 14 and the drain electrode 15, not beneath the gate electrode 18, and so-called floating island region is formed. Thereafter, the resist mask is peeled off.

Here, in the process shown in FIG. 6B, the source electrode 14 and the drain electrode 15 are formed at a predetermined line width and at the predetermined interval, and patterned so as to be able to stride over the root of the gate electrode 18 by the drain electrode 15. The source electrode 14 and the drain electrode 15 patterned in this process are configured so as to approach each other to a channel length of 4 μm or less in the area covered by the gate electrode 18, and the channel length in the floating island region not covered by the gate electrode 18 is 18 μm or more. In other words, the shapes of the source electrode 14 and the drain electrode 15 are determined and patterned in a manner that the OFF-current flowing between the source and the drain in the floating island region is a current value of less than IE-12 ($1 \times 10^{-12}$) A, and the ON-current flowing beneath the actual TFT structure above which and beneath which the gate electrode 18 is disposed is a current value of IE-06 ($1 \times 10^{-6}$) A or more when the voltage by the gate electrode 18 is 20V or more.

According to the above-described process for manufacturing a TFT, the number of required process steps can be decreased in the process for manufacturing a TFT, and decrease in potential due to cross talk from adjacent data lines accompanying the reduction of the number of process steps can be prevented. Furthermore, even if the number of process steps is reduced, the TFT that can sufficiently secure the required ON-current, and can restrain leakage current caused by the floating island region can be provided.

According to the present invention as described above, the leakage current in the floating island region formed in a thin film transistor can be minimized, and the large ON-current required for the operation of the TFT can be maintained.

While the invention has been particularly shown and described with respect to preferred embodiments thereof, it will be understood by those skilled in the art that the foregoing and other changes in form and details may be made therein without departing form the spirit and scope of the invention.

Having thus described our invention, what we claim as new, and desire to secure by Letters Patent is:

1. A thin film transistor, comprising:
   a gate electrode disposed on or above an insulating substrate and formed in a predetermined pattern;
   a semiconductor layer formed in accordance with the pattern of said gate electrode;
   a pixel electrode formed via said semiconductor layer; and
   a signal electrode formed via said semiconductor layer and disposed at a predetermined interval from said pixel electrode,
   said semiconductor layer including a floating island region above or beneath which said gate electrode is not located,
   said pixel electrode and said signal electrode being configured in a manner that an off-current channel length formed by said pixel electrode and said signal electrode in said floating island region is longer than an on-current channel length formed by said pixel and signal electrodes above or beneath said gate electrode.

2. The thin film transistor according to claim 1, wherein said signal electrode is disposed at the location to prevent cross-talk that flows from an adjacent signal line coupled to an adjacent thin film transistor or to said pixel electrode via said semiconductor layer.

3. A thin film transistor, comprising:
   a source electrode and a drain electrode disposed above an insulating substrate at a predetermined interval;
   a semiconductor layer disposed in relation to said source and drain electrodes;
   a gate insulator film overlapping said semiconductor layer; and
   a gate electrode overlapping said gate insulator film,
   said semiconductor layer including a floating island region above or beneath which said gate electrode is not located, and
   said source electrode and said drain electrode being configured in a manner that the length of the channel formed in said floating island region by said source electrode and said drain electrode is 18 μm or more.

4. The thin film transistor according to claim 3, wherein said source electrode and drain electrode are configured in a manner that the length of the channel located above or beneath said gate electrode is 4 μm or less.

5. A thin film transistor, comprising:

a gate electrode disposed on or above an insulating substrate and formed in a predetermined pattern;

a semiconductor layer formed in a pattern substantially identical to the pattern of said gate electrode;

a source electrode formed via said semiconductor layer; and a drain electrode formed via said semiconductor layer and disposed at a predetermined interval from said source electrode, said semiconductor layer including a floating island region above or beneath which said gate electrode is not located, said source electrode and said drain electrode being configured in a manner that an off-current channel length formed by said source electrode and said drain electrode in said floating island region is longer than an on-current channel length formed by said source and drain electrodes above or beneath said gate electrode, and also in a manner that the off-current that flows between said source electrode and said drain electrode when the voltage by said gate electrode is off is less than $1 \times 10^{-12}$ A, and the on-current that flows between said source electrode and said drain electrode when the voltage by said gate electrode is 20 V or more is $1 \times 10^{-6}$ A or more.

6. The thin film transistor according to claim 5, wherein said semiconductor layer comprises a floating island region around said gate electrode and not located above or beneath said gate electrode and said source electrode and said drain electrode being configured in a manner that the off-current that flows in said floating island region is less than $1 \times 10^{-12}$ A.

7. The thin film transistor according to claim 6, wherein said source electrode and said drain electrode are configured in a manner that said off-current is less than $1 \times 10^{-12}$ A and said on-current is $1 \times 10^{-6}$ A or more based on said location of said source and drain electrodes in said floating island region, and said source and drain electrodes disposed above or beneath said gate electrode.

8. A liquid crystal display panel comprising gate lines and signal lines arranged in a matrix shape, and thin film transistors arranged on the intersections of said gate lines and signal lines, and operating liquid crystals by applying a voltage to the display electrode, said thin film transistor comprising a gate electrode connected to said gate lines and formed integrally with said gate lines, a drain electrode connected to said signal lines, a source electrode connected to said display electrode disposed at a predetermined interval from said drain electrode, and a semiconductor layer formed between said source and drain electrodes and said gate electrode, said semiconductor layer having a region around said gate electrode and not located above or beneath said gate electrode, and patterned across the region of said thin film transistor and along said gate lines, said drain electrode being configured in a manner to impede the current flowing from the adjacent signal lines into said source electrode via said semiconductor layer, and configured in a manner that the length of the channel formed between said drain electrode and said source electrode is longer in the region not above or beneath said gate electrode than in the region above or beneath said gate electrode.

9. The liquid crystal display panel according to claim 8, wherein said drain electrode is configured in a manner that said channel length in the region not above or beneath said gate electrode is 18 μm or more.

10. The liquid crystal display panel according to claim 8, wherein said drain electrode is configured in a manner that said channel length in the region above or beneath said gate electrode is 4 μm or less.

11. The liquid crystal display panel according to claim 8, wherein said drain electrode is configured in a manner that the region of said thin transistor is separated from said gate lines.

* * * * *